US005203054A

United States Patent [19]

Arnold

[11] Patent Number: 5,203,054

[45] Date of Patent: Apr. 20, 1993

[54] RETAINER FOR TRUNK LID TORSION BARS

[75] Inventor: Delbert L. Arnold, St. Clair, Mich.

[73] Assignee: Emhart Inc., Newark, Del.

[21] Appl. No.: 951,916

[22] Filed: Sep. 28, 1992

[51] Int. Cl.[5] .......... F16B 7/04

[52] U.S. Cl. .......... 24/336; 24/555; 403/391; 403/394

[58] Field of Search .......... 403/391, 397, 389, 394; 24/563, 555, 545, 336, 531, 557

[56] References Cited

U.S. PATENT DOCUMENTS

| | | | |
|---|---|---|---|
| 3,231,076 | 1/1966 | Freiman | 24/336 X |
| 4,876,771 | 10/1989 | Givati | 24/557 X |

FOREIGN PATENT DOCUMENTS

| | | | |
|---|---|---|---|
| 165106 | 1/1934 | Switzerland | 24/336 |
| 669208 | 3/1952 | United Kingdom | 24/336 |

*Primary Examiner*—James R. Brittain

*Attorney, Agent, or Firm*—Spencer T. Smith

[57] ABSTRACT

A retainer for retaining a pair of vehicular trunk torsion bars which are in non-parallel overlying relation. The retainer has a housing for receiving and resiliently clamping the torsion bars including an elongated upper housing portion, an elongated separator depending from the housing for preventing contact between the clamped torsion bars, and opposed locking fingers for clamping the torsion bars against the upper housing portion. The separator depends downwardly beyond the locking fingers so that the separator can be located between the torsion bars proximate the location where the torsion bars overly, and a tongue projects upwardly from the upper housing and perpendicularly to the separator so that an installer can grip the tongue between adjacent fingers, slide the separator between the torsion bars into engagement therewith at the location where the torsion bars overly and pull the housing against the torsion bars to nest the torsion bars in the housing.

3 Claims, 1 Drawing Sheet

RETAINER FOR TRUNK LID TORSION BARS

The trunk lid of a vehicle is stabilized by a pair of torsion bars. These bars are obliquely related and if left loose would rattle at the location where they intersect. Conventionally, an insert molded foam sleeve is located on one of the torsion bars in the area of this intersection and the second torsion bar is tied to this sleeve with a tie strap.

Applying such a fastener may require the operator to see the torsion bars and this may in fact require the operator to get into the trunk. Such is very undesirable.

It is accordingly an object of the present invention to connect the torsion bars without seeing the torsion bars so that the operator can install the fastener without entering the trunk.

Other objects and advantages of the present invention will become apparent from the following portion of this specification and from the accompanying drawings, which illustrate in accordance with the mandate of the patent statutes, a presently preferred embodiment incorporating the principles of the invention.

Referring to the drawings.

Figure 1:
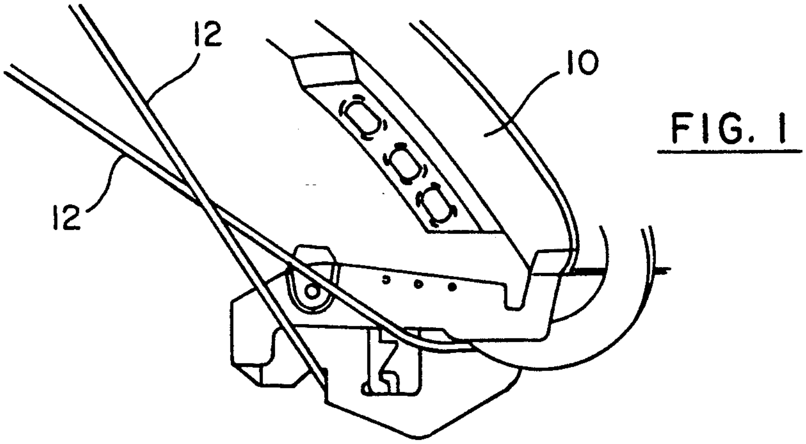
FIG. 1 is an oblique view of a portion of the torsion bar assembly of a vehicle trunk.

To stabilize movement of a vehicular trunk lid 10, a torsion bar assembly made up of a pair of torsion bars 12 is secured to the trunk lid. These torsion bars are obliquely related and are held by a retainer 14 which has a pair of elongated nesting channels 16, each defined by a locating groove 18, defined in the base 19, having substantially the same radius as the torsion bars, a separator 20 which extends the length of these channels for preventing the bars from hitting one another, and locking fingers 22 which also extend the length of the channels for engaging the outer surface of a torsion bar nested within the channels 16.

Figure 2:
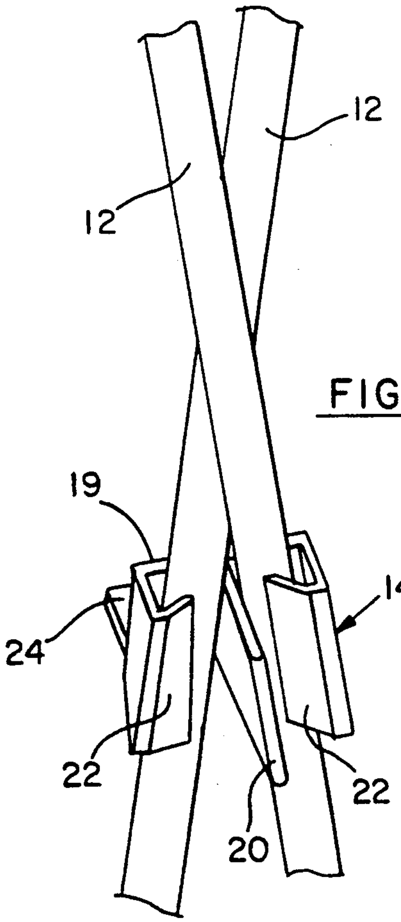
FIG. 2 is an oblique view of an installed retainer.
Figure 3:
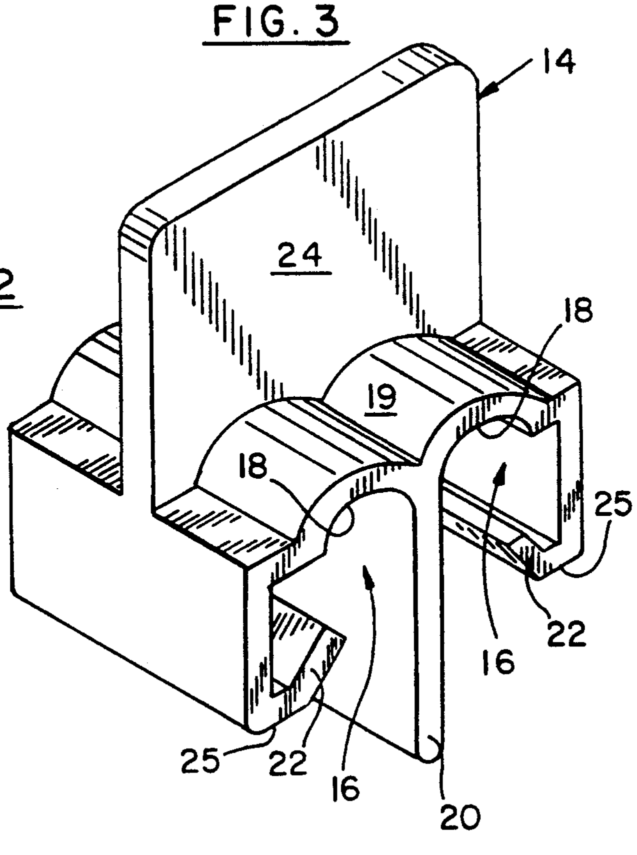
FIG. 3 is an oblique view of the torsion bar retainer made in accordance with the teachings of the present invention.

The separator 20 extends beyond the outer ends 25 of the locking fingers so that it can be located between the torsion bars above or below their location of intersection. Movement of the retainer toward the intersection location (upwardly to reach the position shown in FIG. 2) with a concurrent pulling of the retainer will result in the torsion bars nesting within the nesting channels. The fingers are configured to have inwardly bent free ends 22 that will be deflected by the bars upon insertion of the bars and spring free upon nesting to capture the bars.

An orientation tongue 24 extends perpendicularly from the base 19 in a direction opposite to the direction of the separator and bisects the base 19 so that an installer can grip the retainer with the orientation tongue between his forefinger and middle finger thereby properly orienting the separator 20. The locking fingers have sufficient flexibility to accommodate the out of parallelism of the torsion bars within the nesting channels 16.

I claim:

1. A retainer for retaining a pair of vehicular trunk torsion bars which are in non-parallel overlying relation comprising housing means for receiving and resiliently nesting the torsion bars including an elongated upper housing portion, an elongated separator depending from said housing portion for preventing contact between the clamped torsion bars, opposed locking fingers spaced from said separator and depending from said upper housing portion for defining a pair of nesting channels in which said torsion bars can be nested, said separator depending downwardly beyond said locking fingers a distance selected so that said separator can be located between the torsion bars proximate the location where the torsion bars overly, and a tongue projecting upwardly from said upper housing portion and extending perpendicularly to said separator and located centrally on said upper housing portion so that an installer can grip said tongue between adjacent fingers, slide said separator between the torsion bars into engagement therewith at the location where the torsion bars overly and pull said housing against the torsion bars to nest the torsion bars in said nesting channels.

2. A retainer according to claim 1, wherein the free end of each of said locking fingers is bent inwardly towards said upper housing portion.

3. A retainer according to claim 2, wherein said upper housing portion includes a bar shaped channel on the inside surface thereof on either side of said separator.

* * * * *